(12) United States Patent
Lewis et al.

(10) Patent No.: US 12,536,323 B2
(45) Date of Patent: Jan. 27, 2026

(54) DATA DETECTION USING INTELLIGENT SAMPLING

(71) Applicant: Netflix, Inc., Los Gatos, CA (US)

(72) Inventors: Scott Lamar Lewis, San Jose, CA (US); Yvonne Yu Zhou, San Francisco, CA (US); Sarika Shankar Padmashali, San Jose, CA (US); Prithviraj Ajay Vishwakarma, San Francisco, CA (US); Omkar Joshi, Fremont, CA (US)

(73) Assignee: Netflix, Inc., Los Gatos, CA (US)

( * ) Notice: Subject to any disclaimer, the term of this patent is extended or adjusted under 35 U.S.C. 154(b) by 166 days.

(21) Appl. No.: 18/467,484

(22) Filed: Sep. 14, 2023

(65) Prior Publication Data

US 2025/0094637 A1 Mar. 20, 2025

(51) Int. Cl.
*G06F 21/62* (2013.01)
(52) U.S. Cl.
CPC .................. *G06F 21/6245* (2013.01)
(58) Field of Classification Search
CPC .................. G06F 21/552; G06F 21/60; G06F 21/62–6227; G06F 21/6245; G06N 20/00; H04L 63/1408–1425; H04L 63/20; H04W 12/02
See application file for complete search history.

(56) References Cited

U.S. PATENT DOCUMENTS

| | | | |
|---|---|---|---|
| 10,810,317 B2 | 10/2020 | Williamson | |
| 2016/0328562 A1* | 11/2016 | Saxena | G06F 21/566 |
| 2021/0374163 A1* | 12/2021 | Wang | G06F 11/3428 |

FOREIGN PATENT DOCUMENTS

EP 2942731 A1 11/2015

OTHER PUBLICATIONS

International Search Report and Written Opinion for International Application No. PCT/US2024/046316, mailed on Oct. 29, 2024; 14 pages.
Petrov et al., "Effective and Efficient Training for Sequential Recommendation Using Recency Sampling", 2022, Association for Computing Machinery, p. 1-11; 11 pages.

* cited by examiner

*Primary Examiner* — Kevin Bechtel
(74) *Attorney, Agent, or Firm* — Greenberg Traurig, LLP (57) ABSTRACT

A computer-implemented method includes determining that a specific type of information is to be identified in a set of data. The method further includes sampling the set of data according to various sampling criteria to identify the specified type of information. The sampling criteria include at least a recency criterion indicating that the data to be sampled has been updated within a specified timeframe and a lineage criterion indicating that the data to be sampled is within a maximum hierarchical distance from a source data structure. The method also includes identifying, from the data that was sampled according to the sampling criteria, one or more data structures that include the specified type of information. The method further includes applying security policies to the identified data structures based on the type of information that was identified in the set of data. Various other methods, systems, and computer-readable media are also disclosed.

20 Claims, 6 Drawing Sheets

DATA DETECTION USING INTELLIGENT SAMPLING

BACKGROUND

As online activity has grown during recent years, it has become increasingly apparent that users' personal information needs to be protected. Internet and web users provide their personally identifiable information (PII) to different websites in order to make purchases, conduct transactions, or access services. These websites or other similar platforms often attempt to take precautionary measures to ensure that the users' personal information (PI) is kept private and safe. In some cases, for instance, website owners would try to manually identify information that was known to be personal information and then tag it with a specific tag (e.g., first and last name, address, phone number, internet protocol (IP)) address, email address, medical information, etc.). The tagged data would then be safeguarded accordingly.

In other cases, website owners (or other possessors of PI) would implement a simple dictionary lookup using keywords or use regular expressions to look for certain types of data. These traditional solutions, however, do not account for situations where a user's PI takes a new form or is stored in different locations. Methods to simply search for certain tags or certain keywords or expressions typically will not catch all of the user PI in a system. As a result, that PI will not be properly safeguarded and, despite some best efforts, may still be inadvertently exposed to the public.

SUMMARY

As will be described in greater detail below, the present disclosure generally describes systems and methods for identifying specific types of data structures and then taking appropriate actions for those data structures according to security policies. Accurately identifying these types of data structures and taking appropriate actions based on security policies may improve the handling and safeguarding of this data.

In one example, a computer-implemented method for identifying specified types of data structures and taking appropriate actions according to security policies includes determining that a specific type of information is to be identified in a set of data. The method further includes sampling the set of data according to various sampling criteria to identify the specified type of information. In this method, the sampling criteria may include: a recency criterion indicating that the data to be sampled has been updated within a specified timeframe and a lineage criterion indicating that the data to be sampled is within a maximum hierarchical distance from a source data structure. The method further includes identifying, from the data that was sampled according to the sampling criteria, different data structures that include the specified type of information and then applying security policies to the identified data structures based on the type of information that was identified in the set of data.

In some embodiments, the data structures that include the specified type of information are further classified according to different data classification rules. In some cases, the data classification rules further define which data structures qualify as including the specified type of information. In some examples, the data classification rules filter the data structures that include the specified type of information into groups that include subtypes of the specified type of information. In some cases, the data classification rules are defined by a user.

In some examples, the data set is randomly sampled according to at least the recency criterion and the lineage criterion until a statistically significant number of samples have been taken from the set of data. In some embodiments, the data structures that were identified as including the specified type of information are stored in a catalog that is specific to the set of data. In some examples, the lineage criterion indicates a relative importance of sampling the set of data. In some cases, data that is hierarchically closer to the source data structure has a higher relative importance, and data that is hierarchically further from the source data structure has a lower relative importance.

In some embodiments, the above-described method includes providing a recommendation to an owner or manager of the identified data structures indicating which data structures are identified as including the specified type of information. In some cases, sampling is avoided for datasets that are outside of the specified timeframe. In some examples, the specified type of information includes personally identifiable information.

Still further, a corresponding system includes at least one physical processor and physical memory that includes computer-executable instructions that, when executed by the physical processor, cause the physical processor to: determine that a specific type of information is to be identified in a set of data and sample the set of data according to various sampling criteria to identify the specified type of information. The sampling criteria include a recency criterion indicating that the data to be sampled has been updated within a specified timeframe and a lineage criterion indicating that the data to be sampled is within a maximum hierarchical distance from a source data structure. The physical processor also identifies, from the data that was sampled according to the sampling criteria, data structures that include the specified type of information and applies various security policies to the identified data structures based on the type of information that was identified in the set of data.

In some examples, the lineage criterion is given higher weighting during the sampling, such that source data structures are prioritized when performing the sampling. In some embodiments, identifying the data structures that include the specified type of information includes identifying at least one new subtype of the specified type of information. In some cases, the newly identified subtype of the specified type of information is implemented as feedback when identifying other instances of the specified type of information. In some examples, the feedback includes a mapping between the newly identified subtype and the sampled data. Still further, in some embodiments, the classification rules are automatically generated based on the mapping. Moreover, in some cases, the automatically generated classification rules are refined over time as new subtypes of the specified type of information are identified in the set of data or in other sets of data.

In some examples, the above-described method is encoded as computer-readable instructions on a computer-readable medium. For example, in some cases, a computer-readable medium includes computer-executable instructions that, when executed by a processor of a computing device, cause the computing device to: determine that a specific type of information is to be identified in a set of data and sample the set of data according to various sampling criteria to identify the specified type of information. The sampling criteria include a recency criterion indicating that the data to be sampled has been updated within a specified timeframe and a lineage criterion indicating that the data to be sampled is within a maximum hierarchical distance from a source data structure. The physical processor also identifies, from the data that was sampled according to the sampling criteria, data structures that include the specified type of information and applies various security policies to the identified data structures based on the type of information that was identified in the set of data.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to identifying specific types of data structures and then taking appropriate actions for those data structures according to security policies. As noted above, personally identifiable information may be collected and stored in a variety of different forms. Personal information (PI) may include a wide variety of different information including, but not limited to, first or last name, location, phone number, email address, home address, driver's license number, social security number, credit card information, service subscription information, service usage data, medical information, tax information, or other information from which PI could be derived. This personal information, at least in some cases, is required to be safeguarded by those who have access to the information.

In some traditional systems, this information may not be localized in a single system or even in a single database. Rather, a user's personal information may be scattered across many systems, databases, web platforms, or other physical or logical locations. Accordingly, some entities may take steps to find and safeguard this data. This process typically involves searching for tags or keywords within large databases. The searching process takes up large amounts of computing resources, and typically produces substandard and often unsatisfactory results. Consequently, in these traditional systems, users' PI may be maliciously found and released or may be inadvertently made public simply because the information was never correctly identified as PI.

In contrast, the systems described herein are designed to identify specific types of data structures, including personal information, and then take appropriate actions for those data structures according to security policies. The systems herein implement intelligent sampling techniques to find PI across systems, databases, and platforms in a much more efficient manner that uses less time and fewer computing resources. These systems implement sampling criteria that greatly narrows the search parameters used and focuses on how recently the data structures were created or modified, as well as how the data structures are related to other data structures that may be known to include PI. Once these data structures have been identified as including PI, the systems herein take specific actions to safeguard the data according to security policies. These processes will be described in greater detail below with reference to FIGS. 1-6.

Figure 1:
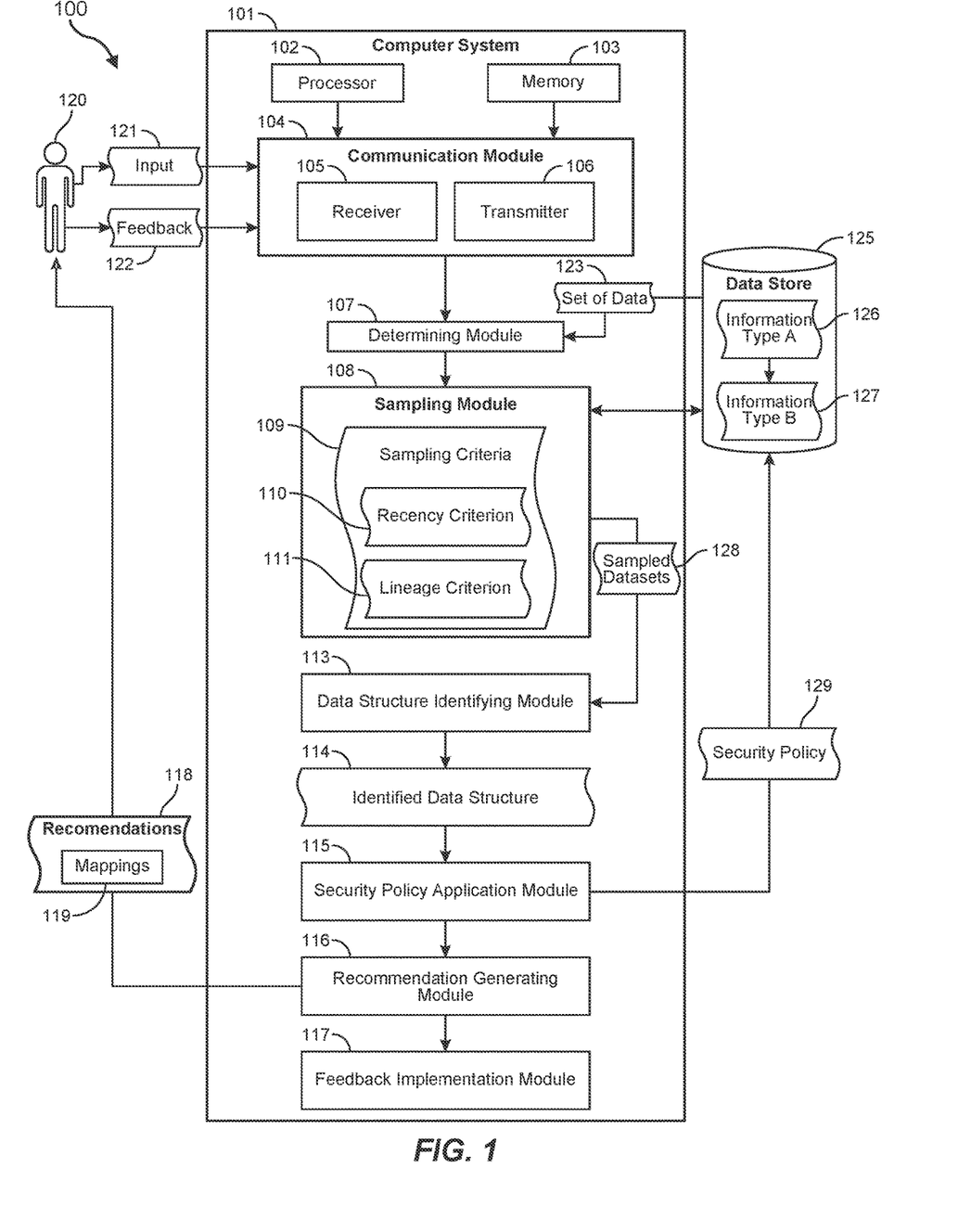
FIG. 1 illustrates an example computer architecture in which the embodiments described herein may operate.

FIG. 1, for example, illustrates a computing environment 100 in which specified types of data structures are identified and in which appropriate actions are taken for those data structures according to security policies. FIG. 1 includes various electronic components and elements including a computer system 101 that is used, alone or in combination with other computer systems, to perform associated tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes a determining module 107. The determining module 107 is configured to determine that a specific type of information is to be identified. This information may include many different types of information, including personal information (PI), corporate or business information, government information, or other specific types of information. Personal information may include substantially any information that may be used to identify a specific person or information that is related to a specific person and is deemed to be private or confidential for that person. For instance, if a person is subscribed to a specific service or web platform, other entities outside of that service or platform do not need to know the user's association with that platform. The personal information may include many different types and/or subtypes of information, including information type A 126 (e.g., name or age), type B 127 (e.g., email address or account number), or other information types. Data store 125, which may be a local or remote data store, may include vast amounts of data, of which the information types A and B (126/127) may be only a small part. The determining module 107 may access a set of data 123 that potentially includes information types A, B, or other types, and may determine that one or more of these information types are to be found in the set of data 123.

The sampling module 108 of computer system 101 may be configured to sample the data set 123 using one or more sampling criteria 109. The sampling criteria may include a recency criterion 110, a lineage criterion 111, and/or other sampling criteria. The recency criterion 110 may provide an indication of when a data structure was last accessed or when the data structure was created. The recency criterion 110 may specify, for example, that the data structures are to have been created or modified within the last two hours, or eight hours, or 24 hours, or 2 days, or 7 days, or 30 days, or 365 days, etc. This may greatly reduce the amount of data that needs to be sampled by the sampling module 108. For instance, if some data sets 123 have been previously sampled and have not been modified or changed within a specified timeframe, anything beyond that timeframe (i.e., anything older) would not need to be sampled and computing resources dedicated to that sampling task could be avoided. This may also avoid higher storage costs for data that has not been accessed (i.e., sampled) in the last 30 days or 60 days or 90 days.

The lineage criterion 111 may specify a data structure's relation to or dependency from other data structures. The lineage criterion 111 may specify, for example, that data structures directly related to previously sampled data structures receive a proportionally lesser sampling (or no sampling at all). Thus, if a data structure has been previously sampled for PI, and a derivative data structure is created based on the source data structure, that derivative (related) data structure may be less likely to include PI and may thus be only lightly sampled or not sampled at all. In some cases, a data structure may be related to multiple data structures and may be sampled to the degree that it directly relates to other (previously sampled) data structures. If the data structure is unrelated to other structures or is related to other data structures that have not been sampled, the data structure may be subject to a full sampling.

The data structure identifying module 113 may then identify, from the data that was sampled 128 according to the sampling criteria 109, different data structures 114 that include information type A (126), type B (127), or other specified type. The security policy application module 115 may then apply security policies 129 to the identified data structures 114 that include the PI or other information. The security policies 129 may indicate, for example, that the identified data structures are to be encrypted, stored in a different storage system, stored according to stricter security protocols (e.g., that only allow access by authorized, authenticated users), or are to be subject to other steps to secure and protect the information.

In some cases, administrators or other users that work to identify PI or other similar information may provide mappings 119 of PI to specific data structures. These mappings 119 may be used to place additional emphasis on certain data structures when sampling or may be used along with other user- or computer-generated recommendations 118 to improve the sampling function of the sampling module 108. In this manner, the sampling module 108 may be continually improved and may learn and become more efficient over time at properly sampling those data structures most likely to contain PI or other sought-after information. These processes will be described in greater detail with respect to method 200 of FIG. 2 and FIGS. 1-6 below.

Figure 2:
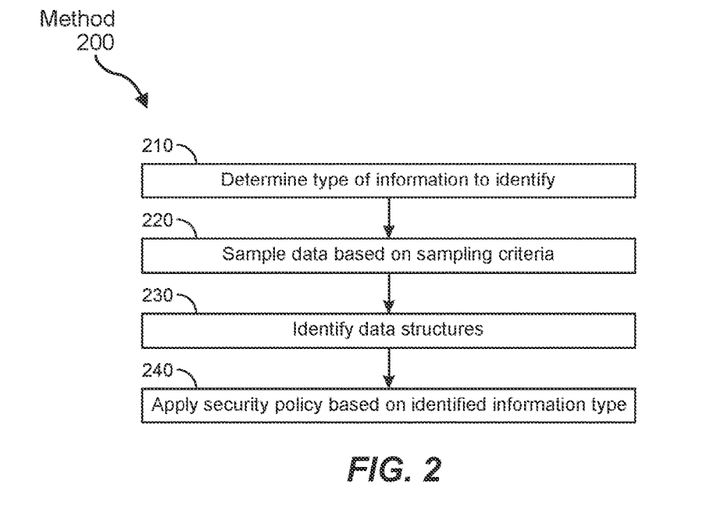
FIG. 2 illustrates a flow diagram of an exemplary method for identifying specified types of data structures and taking appropriate actions for those data structures according to security policies.

FIG. 2 is a flow diagram of an exemplary computer-implemented method 200 for identifying specific types of data structures and taking appropriate actions according to security policies. The steps shown in FIG. 2 may be performed by any suitable computer-executable code and/or computing system, including the systems illustrated in FIG. 1. In one example, each of the steps shown in FIG. 2 may represent an algorithm whose structure includes and/or is represented by multiple sub-steps, examples of which will be provided in greater detail below.

Method 200 includes, at 210, determining that a specific type of information is to be identified in a set of data. At step 220, method 200 includes sampling the set of data according to various sampling criteria to identify the specified type of information. The sampling criteria may include: a recency criterion indicating that the data to be sampled has been updated within a specified timeframe and a lineage criterion indicating that the data to be sampled is within a maximum hierarchical distance from a source data structure. At step 230, method 200 includes identifying, from the data that was sampled according to the sampling criteria, different data structures that include the specified type of information. And, at step 240, method 200 includes applying security policies to the identified data structures based on the type of information that was identified in the set of data. These various types of information may be identified and appropriately handled using the detection platform 303 of FIG. 3

Figure 3:
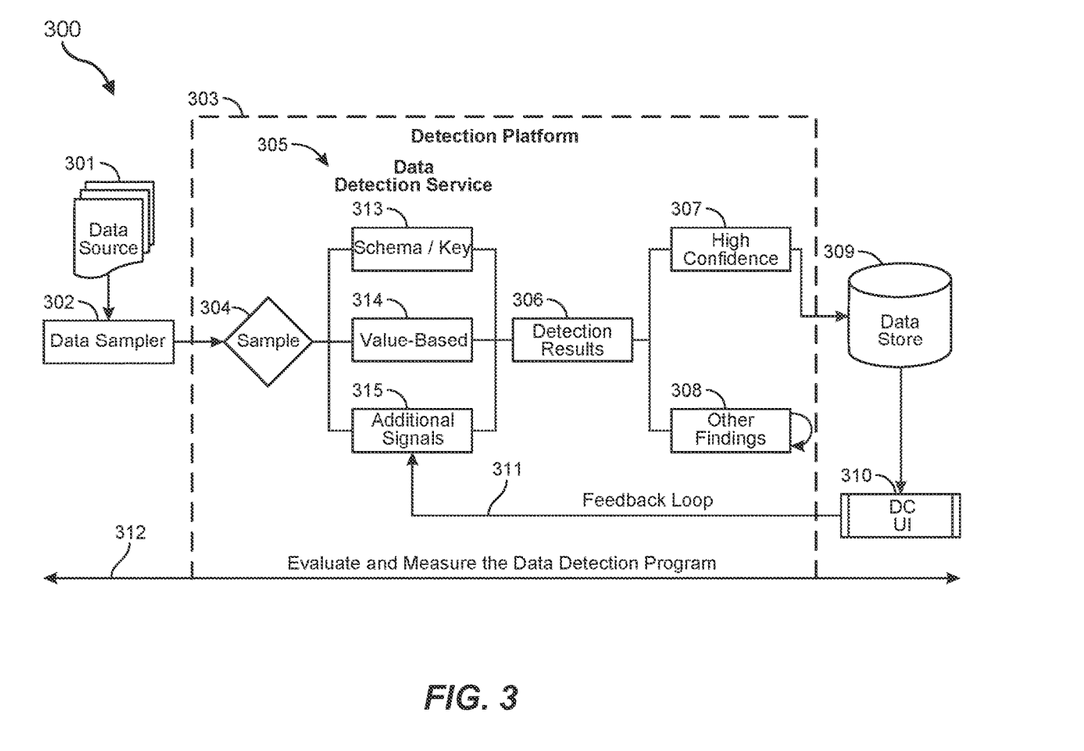
FIG. 3 illustrates a detection platform for identifying specified types of data structures and taking appropriate actions according to security policies.

The detection platform 303 of embodiment 300 in FIG. 3 may include various hardware and/or software components and modules for detecting specified types of data. The detection platform 303 includes a data detection service 305 that may detect different types of data using schemas or keys 313, using specific values 314, or using other signals 315. Prior to the data detection service 305 performing the data detection, a data sampler 302 will sample the source data 301 to create a data sample 304. As noted above, the data sampler 302 may sample the data in a smart manner, without expending the computational effort to sample every bit of data in the data source 301. Rather, the data sampler 302 may implement criteria, including a recency criterion and/or a lineage criterion, to narrow down the amount of data that is sampled. Thus, at least in some cases, for example, the data sampler 302 may sample data that has been changed in the last 24 hours (according to the recency criterion) and that has a direct relationship to at least one data structure known to include PI (or other desired information type) according to the lineage criterion. This sampled data 304 may then be provided to the data detection service 305.

The data detection service 305 may be configured to identify, from the data that was sampled using the sampling criteria, different data structures (e.g., detection results 306) that include personal information or another specified type of information. In some cases, the data detection service 305 may implement a schema- or key-based detection algorithm to identify the specified information type. The schema- or key-based detection algorithm may provide schemas under which or with which the PI is likely to be associated. Moreover, keys may specify words, fields, hashes, or other elements that may be associated with certain types of PI. These keys may then be used to identify the PI within the sampled data 304.

Additionally, values 314 or other signals 315 may be used to identify or detect PI within sampled data. The values may indicate numbers, words, strings, or other indicators that are known to indicate the presence of PI. At least some of the detection results 306 may be assigned a confidence level 307, indicating how confident the underlying system is that a given set of detection results is likely to be accurate (i.e., to correctly include PI). Other findings 308 may be stored and cataloged and used when evaluating, measuring, and improving the data detection program (312). Detection results 306, along with confidence measurements 307, may be stored in a local or remote data store 309.

In some cases, an administrator or other user may access the stored results and confidence measurements using a user interface 310. This UI may allow the user (e.g., user 120 of FIG. 1 providing feedback 122 via input 121) to provide feedback regarding the detection results and/or the assigned confidence level. This feedback may then be used in a feedback loop 311 to improve the functioning of the data detection service 305. For instance, if the service detected an instance of PI and assigned to it a high confidence level, and if the user provided feedback indicating that the finding was not, in fact, PI, the data detection service 305 may automatically make changes to its algorithms (e.g., modifying schemas, keys, values, or other signals) so that the service will no longer identify that data as PI. Reverse cases are also true. As such, the feedback loop 311 can be continually used (using feedback from a user and/or from another computer system) to improve the accuracy of the data detection service 305.

Figure 4:
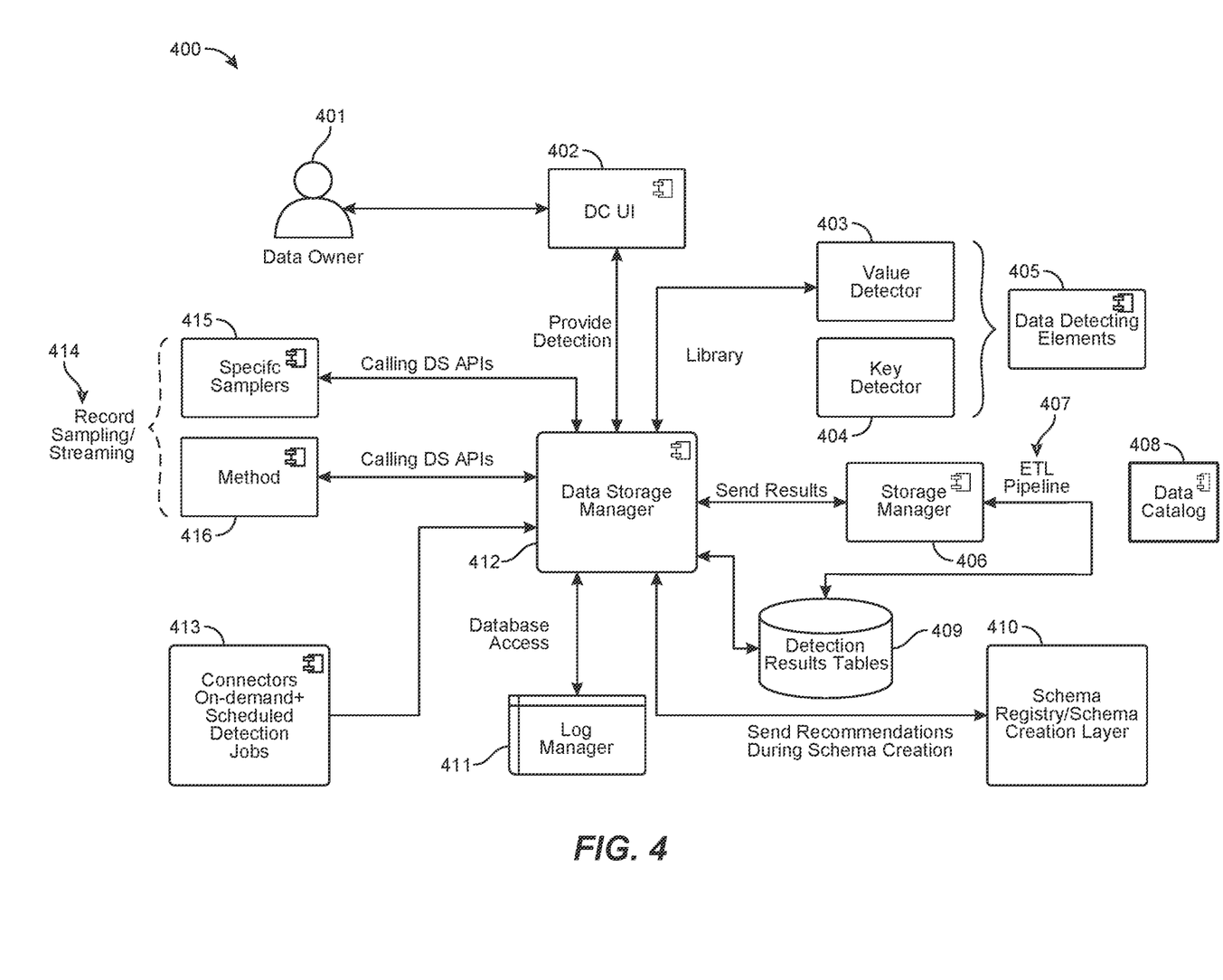
FIG. 4 illustrates an embodiment of a data identifying architecture for identifying specified types of data structures and taking appropriate actions according to security policies.

FIG. 4 illustrates an embodiment 400 in which a data storage manager 412 determines where data is stored and determines how the data is to be sampled and searched for PI or other data types. In FIG. 4, a data owner 401 may implement a data catalog (DC) user interface (UI) 402 to interact with the data storage manager 412 and/or a data catalog 408. In some cases, the data owner 401 may use the UI 402 to provide detection criteria to the data storage manager 412. The data storage manager 412 may use application programming interfaces (APIs) (e.g., APIs that are specific to data stores) to implement specific samplers 415 or specific sampling methods 416. Different samplers 415 may be used, at least in some cases, to search for email addresses or usernames than samplers used to search for social security numbers or credit card numbers. Moreover, different sampling methods 416 may be implemented when searching for tax information or medical information or other PI. In some cases, the sampling and accessing of data may be recorded (414) and used for feedback purposes.

The data storage manager 412 may store data sampling and/or detection results in a log manager 411 or log database that categorizes and stores data logs. In some cases, sampling and detection tasks may be scheduled in advance, while in other cases, the sampling and/or detection tasks are performed on demand (413). The scheduling may arrange these sampling and detection tasks for minutes, hours, days, weeks, or months in the future, or may schedule these tasks to occur each time data is updated or on a periodic (daily, weekly, etc.) basis. In embodiments where value detectors 403, key detectors 404, schema detectors, or other data detecting elements 405 are used to detect certain data types, the results of the detection may be cataloged and recorded by the data storage manager 412.

Results of the data detection process may be noted and used for feedback. Accordingly, if the data storage manager 412 detected PI or other desired information types and the data owner 401 confirmed that the detections were accurate and proper, the data storage manager 412 may note that the detection rules 409 used in that instance and may store the detection results and/or the detection process using a storage manager 406 in an extract, transform, and load (ETL) process as part of ETL pipeline 407. The data storage manager 412 (or data owner 401) may also generate a recommendation or a new schema 410 for use in future PI detection. Similarly, if the data storage manager 412 did not detect PI (or other desired information type), but the data owner 401 confirmed that the data source did, in fact, include PI, then the data storage manager 412 may note the detection rules 409 or schemas used were inaccurate and either should not be used in future data detections or should be modified to become more accurate. Thus, in this manner, detection rules and schemas may be refined over time to learn from inaccuracies and to retain those rules and schemas that did accurately identify the sought-after data.

Figure 5:
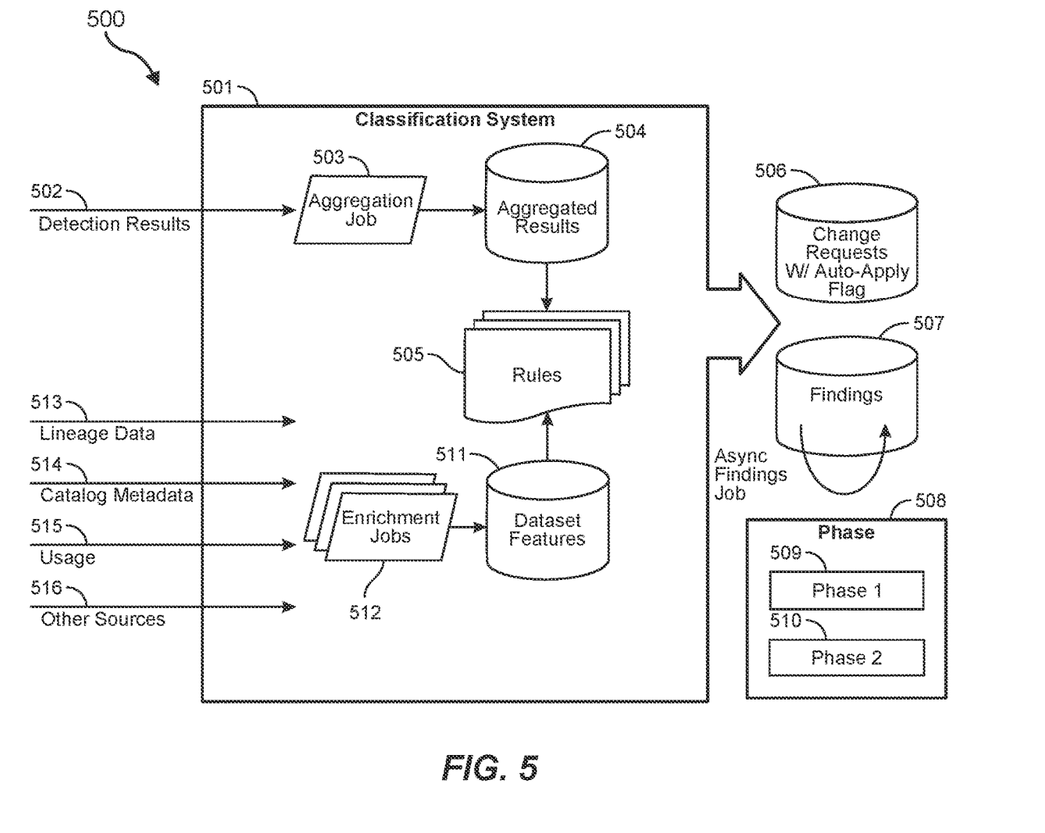
FIG. 5 illustrates an embodiment in which classification rules are used to identify specified types of data structures and take appropriate actions according to security policies.

FIG. 5 illustrates an embodiment 500 in which classification rules 505 may be implemented to further define which data structures qualify as including PI or other types of information. In some cases, the classification rules 505 may be applied by the system after the initial data sampling has occurred (e.g., based on the recency criterion and/or the lineage criterion) and after the information type detection has occurred. Thus, in the embodiment 500 of FIG. 5, the results of the information type detection (results 502) may be provided to an aggregation job 503 that aggregates the detection results from different detection instances into a data store of aggregated results 504. Other data may also be provided and implemented when applying classification rules 505, including lineage data 513 specifying which other data structures the identified data structure is related to (i.e., which data structures it is derived from or based on), catalog metadata 514 indicating information about the data structure (e.g., size, location, name, creator, etc.), usage information 515 indicating how and/or where the data structure has been used, along with other source of information 516 about the specified data structure that may be useful when classifying the detected information types.

As noted previously, the data structures that include PI or other specified types of information may be further classified according to different data classification rules 505. These classification rules may further define which data structures qualify as including the PI or other specified type of information. The classification system 501 may implement various classification rules 505 as subsequent gatekeepers (beyond sampling and detecting) that help to ensure that the data ultimately indicated as being PI is, in fact, personal information. In some cases, the classification rules may be implemented to remove results that the user would otherwise see. In other cases, the classification rules may be used to positively identify those results that the user will see. The classification rules 505 may indicate, in one example, a subtype of the specified type of information.

For instance, instead of broadly categorizing something as PI, the classification rules may further define the PI as a username, or as a first and last name, or as an address, or as an email address, etc. The classification rules 505 may even further define the PI as an internal email address or an external email address and, if internal, an indication of which department or which type of user is associated with the email address. Thus, the classification rules 505 may be used to assign specific types or subtypes to the general information type. The data classification rules 505 may thus be used to filter the detected data structures that include the PI into groups that include subtypes of the specified type of information. These groups may be stored locally or remotely in a data store.

In some cases, the various forms of input data (e.g., 513-516) used when forming and/or implementing the classification rules 505 may be implemented in different enrichment jobs 512 that provide additional context information to the classification process and help to identify, for example, whom an email address belongs to, their role in the company, and other associated information. This enrichment data may be compiled into dataset features 511 that help define each subtype of PI or other specified data. Accordingly, each subtype of PI may have its own set of features 511 that are sought after when applying the classification rules. This process may even further improve the accuracy of the PI detection algorithms. Still further, results of the classification process (e.g., findings 507) may be stored and used when updating the classification rules as part of an automated learning and feedback process. Any changes to the classification rules may be submitted and automatically applied and designed using an auto-apply flag 506. In some cases, these changes and updates may be applied all at once, while in other cases, the changes may be applied across different phases 508 over time (e.g., phase 1 (509) or phase 2 (510)).

In some embodiments, the data classification rules 505 may be defined by a user. For instance, as shown in FIG. 1, a user 120 may provide input 121 to the communication module 104. The input 121 may include classification rules 505 that are used when classifying detected data structures. The user 120 may specify, for example, in a rule that usernames are to be classified using a specific algorithm that sorts or filters usernames that have a minimum number of characters and consist of a single word or phrase without spaces. The user may specify other rules for other types or subtypes of PI. The user-defined classification rules (e.g., 505) may be applied against incoming detection results 502, which have been detected from sampled data.

As noted above, data sets may be sampled for data according to specified criteria. In some cases, for example, a data set may be randomly sampled according to the recency criterion and/or the lineage criterion (e.g., based on lineage data 513 that identifies a data structure's relationship to other data structures) until a statistically significant number of samples have been taken from the set of data. Thus, sampling may continue on, using the specified criterion or criteria of a dataset until a minimum statistically significant number of samples have been taken. The sampled data may be stored in a catalog. The catalog may include, for example, multiple different subtypes of personal information. In some cases, the catalog is specific to the dataset, while in other cases, a catalog may include sampled data from multiple datasets. In some embodiments, the catalog may be configured to store mapping information (e.g., mapping the classification rule to the detected data), along with example data (e.g., example personal information subtypes).

In some embodiments, as noted above, the data is sampled according to a lineage criterion. The lineage criterion may indicate whether a given data structure was a source data structure (e.g., an original document, spreadsheet, media file (e.g., audio or video file), file storage structure, or other new, original data structure). The lineage criterion may also indicate whether a given data structure is derivative or somehow depends on or was created from a source data structure. This may be a hierarchical relationship in which a given data structure may depend on one or many previous data structures or previous versions of the same data structure. Thus, in this context, a hierarchy may indicate direct or partial relationships to other data structures in which at least some data from the source is copied or otherwise used in the derivative or second order data structures.

In some cases, the lineage criterion may indicate a relative importance of a set of data or may indicate the relative importance of sampling a given set of data. In such cases, data that is hierarchically closer to the source data structure may have a higher relative importance, and data that is hierarchically further from the source data structure may have a lower relative importance. Thus, in at least some embodiments, source documents may be prioritized when sampling for PI, as source documents are more likely to (potentially unknowingly) include PI. Other derivative data structures may have been sampled before and may be known not to include PI. Thus, sampling derivative data structures may be given lower priority or lower importance when rationing computing resources dedicated to sampling.

In some cases, the hierarchical relationship may be referred to as "upstream" or "downstream." In such cases, an upstream table may represent a new or original spreadsheet, while a downstream table may be one that includes portions of the original spreadsheet and potentially other data from other spreadsheets. In this case, the system may be configured to prioritize upstream tables or other data structures, focusing the sampling on those tables before turning to downstream tables. In some examples, this prioritization may carry to data structures that are further and further downstream from upstream data structures, with each further hierarchical level receiving less and less importance relative to the upstream structures. In some embodiments, the lineage criterion itself may be given higher weighting during the sampling. In such cases, other criteria, including the recency criterion, may have a lower weighting and may have less of an influence during sampling. In cases where the lineage criterion is prioritized, data structures determined to be source structures may be prioritized when performing the sampling.

After the sampling has completed on at least some of the data set, the underlying system may identify data structures that include the sought-after information types. In some cases, identifying the data structures that include a specific type of information may include identifying a new subtype of the specified type of information. The new subtype may include an email address, a physical address, a surname, or other information. In such cases, the newly identified subtype of PI, for example, may be implemented as feedback when identifying other instances of the specified type of information.

In FIG. 1, for instance, a feedback implementation module 117 of computer system 101 may identify the newly identified subtype of PI and may implement that new subtype in future searches for PI. In some instances, the feedback may include a mapping between the newly identified subtype and the sampled data. This mapping 119 may be generated by the recommendation generating module 116 of computer system 101. The mapping 119 may map or tie the sampled data 128 to the new PI subtype, for example.

This mapping 119 may then be presented to a data owner 120 in a recommendation 118. The data owner 120 may approve or disapprove of the mapping as being valid or invalid. As such, data owners may resolve disputes as to whether an identified data structure truly constitutes PI. This mapping may then be used or not used in subsequent searches based on the data owner's feedback 122.

Still further, at least in some cases, data owners may create their own mappings or classification rules, which may be provided to and/or stored in a data catalog. Using the classification rules, data owners may apply specific (and potentially complex) logic when creating and applying mappings to identify PI. In some embodiments, classification rules may be automatically generated based on the mapping(s) 119. As such, the system may learn over time and may evolve to include new mappings that identify new types or subtypes of information. In some embodiments, machine learning models may be trained and implemented to learn and generate these mappings. Moreover, the automatically generated classification rules may be refined over time as new subtypes of the specified type of information are identified in the set of data (or in other sets of data) and as mappings are approved or disapproved by data owners.

Figure 6:
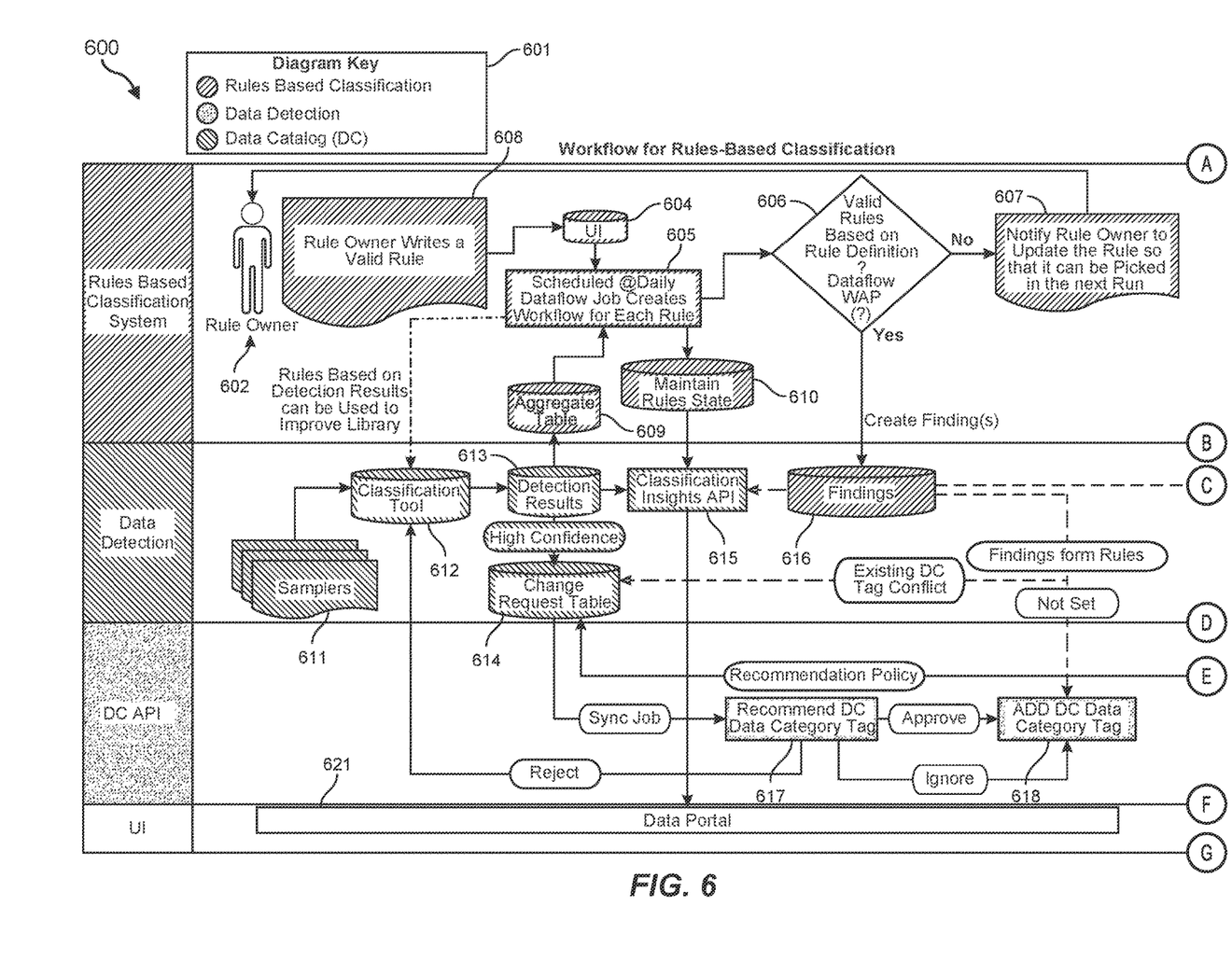
FIG. 6 illustrates a workflow for implementing rules-based classification within a system.

One example workflow for implementing rules-based classification is illustrated in FIG. 6. The workflow 600 shown in FIG. 6 provides different components and elements that may be used as part of a rules-based classification system, as part of the data detection process, and as part of a data catalog API, as indicated in the diagram key 601. The rules-based classification system may include, as part of its flow, a rule owner 602 or data owner who writes a valid classification rule at 608 (e.g., based on a template) for a dataset. The rule owner 602 may use a UI 604 to create the classification rule. A dataflow job may then create a workflow for each rule (605) and store the rule's state in a data store 610. At 606, the system may determine whether the classification rule is valid and, if not, may notify the rule owner of such at 607. If the rule is valid, the system may create findings 616 and implement them as part of the data detection process.

The findings 616 may be provided to a classification insights API 615 that also receives sampled data from different samplers 611 identified by a classification tool 612, as well as detection results 613 that are provided to both an aggregation table 609 and a change request table 614. The classification tool 612 may be configured to sample various data sets, search for specific keys or specific values, and categorize the search results according to confidence level. The classification insights API 615 may then implement the detection results 613 and the classification rule findings 616 to update the workflow (at 619), perform conflict resolution for rules that may not properly identify PI (or other information type), and provide the updates to a data catalog 620 to provide context to the data owners about the detected findings. The data catalog (DC) API may be used to create recommendations (617), to add category tags (618), and to store approved rules (while rejecting disapproved rules). A data portal 621 may be used to access the various elements and components (either directly or indirectly) within the rules-based classification workflow 600 of FIG. 6.

In some embodiments, the data portal 621 (and/or UI 604) may be used to specify which security policies are to be applied upon affirmatively identifying PI (or other data type). In some cases, governance controls may stipulate which security policies are to be applied. These security policies may include labeling the data, quarantining the data, encrypting the data, physically moving the data to a more secure storage location, ensuring that the data is protected by firewalls, by passwords, by two-factor authentication, etc. Moreover, the security policies may indicate which users or user roles have access to the PI or other data to limit the number of people that have access to that data. In some cases, data owners may define the security policies, and/or may specify which existing security policies are to be applied to each type or subtype of information. In this manner, specific actions may be taken for data that has been identified as PI according to established security policies.

Still further, a system corresponding to the above-described method may include at least one physical processor and physical memory that includes computer-executable instructions that, when executed by the physical processor, cause the physical processor to: determine that a specific type of information is to be identified in a set of data and sample the set of data according to various sampling criteria to identify the specified type of information. The sampling criteria include a recency criterion indicating that the data to be sampled has been updated within a specified timeframe and a lineage criterion indicating that the data to be sampled is within a maximum hierarchical distance from a source data structure. The physical processor also identifies, from the data that was sampled according to the sampling criteria, data structures that include the specified type of information and applies various security policies to the identified data structures based on the type of information that was identified in the set of data.

In some examples, the above-described method is encoded as computer-readable instructions on a computer-readable medium. For example, in some cases, a computer-readable medium includes computer-executable instructions that, when executed by a processor of a computing device, cause the computing device to: determine that a specific type of information is to be identified in a set of data and sample the set of data according to various sampling criteria to identify the specified type of information. The sampling criteria include a recency criterion indicating that the data to be sampled has been updated within a specified timeframe and a lineage criterion indicating that the data to be sampled is within a maximum hierarchical distance from a source data structure. The physical processor also identifies, from the data that was sampled according to the sampling criteria, data structures that include the specified type of information and applies various security policies to the identified data structures based on the type of information that was identified in the set of data.

Example Embodiments

Example 1: A computer-implemented method comprising: determining that a specific type of information is to be identified in a set of data; sampling the set of data according to various sampling criteria to identify the specified type of information, the sampling criteria including at least: a recency criterion indicating that the data to be sampled has been updated within a specified timeframe and a lineage criterion indicating that the data to be sampled is within a maximum hierarchical distance from a source data structure, from the data that was sampled according to the sampling criteria, identifying one or more data structures that include the specified type of information and applying one or more security policies to the identified data structures based on the type of information that was identified in the set of data.

Example 2. The computer-implemented method of claim 1, wherein the data structures that include the specified type of information are further classified according to one or more data classification rules.

Example 3. The computer-implemented method of claim 1 or claim 2, wherein the computing device characteristics include at least one of: total system memory, device type identifier, software development kit (SDK) version, streaming buffer size, surface cache capacity, playback resolution, support for flexible streaming buffer, support for flexible graphics memory, user interface height, surface size, chipset manufacturer, or computing device brand name.

Example 4. The computer-implemented method of any of claims 1-3, wherein the data classification rules filter the data structures that include the specified type of information into one or more groups that include subtypes of the specified type of information.

Example 5. The computer-implemented method of any of claims 1-4, wherein one or more of the data classification rules are defined by a user.

Example 6. The computer-implemented method of any of claims 1-5, wherein the data set is randomly sampled according to at least the recency criterion and the lineage criterion until a statistically significant number of samples have been taken from the set of data.

Example 7. The computer-implemented method of any of claims 1-6, wherein the data structures that were identified as including the specified type of information are stored in a catalog that is specific to the set of data.

Example 8. The computer-implemented method of any of claims 1-7, wherein the lineage criterion indicates a relative importance of sampling the set of data.

Example 9. The computer-implemented method of any of claims 1-8, wherein data that is hierarchically closer to the source data structure has a higher relative importance, and wherein data that is hierarchically further from the source data structure has a lower relative importance.

Example 10. The computer-implemented method of any of claims 1-9, further comprising providing a recommendation to an owner or manager of the identified data structures indicating which data structures are identified as including the specified type of information.

Example 11. The computer-implemented method of any of claims 1-10, wherein sampling is avoided for datasets that are outside of the specified timeframe.

Example 12. The computer-implemented method of any of claims 1-11, wherein the specified type of information comprises personally identifiable information.

Example 13. A system comprising at least one physical processor; and physical memory comprising computer-executable instructions that, when executed by the physical processor, cause the physical processor to: determine that a specific type of information is to be identified in a set of data; sample the set of data according to one or more sampling criteria to identify the specified type of information, the sampling criteria including at least: a recency criterion indicating that the data to be sampled has been updated within a specified timeframe; and a lineage criterion indicating that the data to be sampled is within a maximum hierarchical distance from a source data structure; from the data that was sampled according to the sampling criteria, identify one or more data structures that include the specified type of information; and apply one or more security policies to the identified data structures based on the type of information that was identified in the set of data.

Example 14. The system of claim 13, wherein the lineage criterion is given higher weighting during the sampling, such that source data structures are prioritized when performing the sampling.

Example 15. The system of claim 13 or claim 14, wherein identifying the one or more data structures that include the specified type of information comprises identifying at least one new subtype of the specified type of information.

Example 16. The system of any of claims 13-15, wherein the at least one newly identified subtype of the specified type of information is implemented as feedback when identifying other instances of the specified type of information.

Example 17. The system of any of claims 13-16, wherein the feedback includes a mapping between the at least one newly identified subtype and the sampled data.

Example 18. The system of any of claims 13-17, wherein one or more classification rules are automatically generated based on the mapping.

Example 19. The system of any of claims 13-18, wherein the automatically generated classification rules are refined over time as new subtypes of the specified type of information are identified in the set of data or in other sets of data.

Example 20. A non-transitory computer-readable medium comprising one or more computer-executable instructions that, when executed by at least one processor of a computing device, cause the computing device to: determine that a specific type of information is to be identified in a set of data; sample the set of data according to one or more sampling criteria to identify the specified type of information, the sampling criteria including at least: a recency criterion indicating that the data to be sampled has been updated within a specified timeframe; and a lineage criterion indicating that the data to be sampled is within a maximum hierarchical distance from a source data structure; from the data that was sampled according to the sampling criteria, identify one or more data structures that include the specified type of information; and apply one or more security policies to the identified data structures based on the type of information that was identified in the set of data.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining that a specific type of information is to be identified in a set of data comprising a hierarchical structure;
   sampling the set of data according to one or more sampling criteria to identify the specified type of information, the sampling criteria including at least:
      a recency criterion specifying a timeframe, in which data has been updated, from which the data is to be sampled; and
      a lineage criterion specifying a maximum hierarchical distance, from a source data structure within the hierarchical structure, that the data is to be sampled within;
   from the data that was sampled according to the sampling criteria, identifying one or more data structures that include the specified type of information; and
   applying, to the identified data structures, one or more security policies that transform the identified data structures from a less secure state to a more secure state.

2. The computer-implemented method of claim 1, wherein the data structures that include the specified type of information are further classified according to one or more data classification rules.

3. The computer-implemented method of claim 2, wherein the data classification rules further define which data structures qualify as including the specified type of information.

4. The computer-implemented method of claim 2, wherein the data classification rules filter the data structures that include the specified type of information into one or more groups that include subtypes of the specified type of information.

5. The computer-implemented method of claim 2, wherein one or more of the data classification rules are defined by a user.

6. The computer-implemented method of claim 1, wherein the data set is randomly sampled according to at least the recency criterion and the lineage criterion until a statistically significant number of samples have been taken from the set of data.

7. The computer-implemented method of claim 1, wherein the one or more security policies comprise a policy to:
   encrypt the identified data structures;
   restrict access to the identified data structures;
   relocate the identified data structures;
   apply a label to the identified data structures; or
   quarantine the identified data structures.

8. The computer-implemented method of claim 1, wherein the lineage criterion indicates a relative importance of sampling the set of data.

9. The computer-implemented method of claim 8, wherein data that is hierarchically closer to the source data structure has a higher relative importance, and wherein data that is hierarchically further from the source data structure has a lower relative importance.

10. The computer-implemented method of claim 1, further comprising providing a recommendation to an owner or manager of the identified data structures indicating which data structures are identified as including the specified type of information.

11. The computer-implemented method of claim 1, wherein sampling is avoided for datasets that are outside of the specified timeframe.

12. The computer-implemented method of claim 1, wherein the specified type of information comprises personally identifiable information.

13. A system comprising:
at least one physical processor; and
physical memory comprising computer-executable instructions that, when executed by the physical processor, cause the physical processor to:
   determine that a specific type of information is to be identified in a set of data comprising a hierarchical structure;
   sample the set of data according to one or more sampling criteria to identify the specified type of information, the sampling criteria including at least:
      a recency criterion specifying a timeframe, in which data has been updated, from which the data is to be sampled; and
      a lineage criterion specifying a maximum hierarchical distance, from a source data structure within the hierarchical structure, that the data is to be sampled within;
   from the data that was sampled according to the sampling criteria, identify one or more data structures that include the specified type of information; and
   apply, to the identified data structures, one or more security policies that transform the identified data structures from a less secure state to a more secure state.

14. The system of claim 13, wherein the lineage criterion is given higher weighting during the sampling, such that source data structures are prioritized when performing the sampling.

15. The system of claim 13, wherein identifying the one or more data structures that include the specified type of information comprises identifying at least one new subtype of the specified type of information.

16. The system of claim 15, wherein the at least one new subtype of the specified type of information is implemented as feedback when identifying other instances of the specified type of information.

17. The system of claim 16, wherein the feedback includes a mapping between the at least one newly identified subtype and the sampled data.

18. The system of claim 17, wherein one or more classification rules are automatically generated based on the mapping.

19. The system of claim 18, wherein the automatically generated classification rules are refined over time as new subtypes of the specified type of information are identified in the set of data or in other sets of data.

20. A non-transitory computer-readable medium comprising one or more computer-executable instructions that, when executed by at least one processor of a computing device, cause the computing device to:
   determine that a specific type of information is to be identified in a set of data comprising a hierarchical structure;
   sample the set of data according to one or more sampling criteria to identify the specified type of information, the sampling criteria including at least:
      a recency criterion specifying a timeframe, in which data has been updated, from which the data is to be sampled; and
      a lineage criterion specifying a maximum hierarchical distance, from a source data structure within the hierarchical structure, that the data is to be sampled within;
   from the data that was sampled according to the sampling criteria, identify one or more data structures that include the specified type of information; and
   apply, to the identified data structures, one or more security policies that transform the identified data structures from a less secure state to a more secure state.

* * * * *